US009159122B2

(12) United States Patent
Zabic et al.

(10) Patent No.: US 9,159,122 B2
(45) Date of Patent: Oct. 13, 2015

(54) IMAGE DOMAIN DE-NOISING (71) Applicant: KONINKLIJKE PHILIPS N.V., Eindhoven (NL)

(72) Inventors: Stanislav Zabic, Lyndhurst, OH (US); Kevin Brown, Chardon, OH (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/357,793

(22) PCT Filed: Nov. 12, 2012

(86) PCT No.: PCT/IB2012/056342
§ 371 (c)(1),
(2) Date: May 13, 2014

(87) PCT Pub. No.: WO2013/076613
PCT Pub. Date: May 30, 2013

(65) Prior Publication Data
US 2014/0314331 A1    Oct. 23, 2014

Related U.S. Application Data

(60) Provisional application No. 61/563,078, filed on Nov. 23, 2011.

(51) Int. Cl.
*G06K 9/40*  (2006.01)
*G06T 5/00*  (2006.01)

(52) U.S. Cl.
CPC ....... *G06T 5/002* (2013.01); *G06T 2207/10072* (2013.01); *G06T 2207/20076* (2013.01); *G06T 2207/30004* (2013.01)

(58) Field of Classification Search
None
See application file for complete search history.

(56) References Cited

U.S. PATENT DOCUMENTS

| 7,982,747 | B1* | 7/2011 | Dulaney et al. ............... 345/619 |
| 2009/0232375 | A1 | 9/2009 | Ye et al. |
| 2011/0052030 | A1 | 3/2011 | Bruder et al. |
| 2011/0229007 | A1 | 9/2011 | Jerebko |
| 2011/0262054 | A1 | 10/2011 | Benson et al. |
| 2012/0224760 | A1 | 9/2012 | Goshen et al. |
| 2013/0208971 | A1 | 8/2013 | Brown et al. |

FOREIGN PATENT DOCUMENTS

| DE | 102006055381 A1 | 5/2008 |
| WO | 2008031461 A1 | 3/2008 |

OTHER PUBLICATIONS

Dong, G., et al.; On the Convergence of Bilateral Filter for Edge-Preserving Image Smoothing; 2007; IEEE Signal Processing Letters; 14(9)617-620.
Brown, K. M., et al.; Acceleration of ML iterative algorithms for CT by the use of fast start images; 2012; SPIE 8313; abstract.

(Continued)

*Primary Examiner* — Bhavesh Mehta
*Assistant Examiner* — Feng Niu (57) ABSTRACT

An image data processing component (122) includes algorithm memory (212) including one or more image domain only iterative de-noising algorithms (214) based on the Huber roughness penalty minimization and a processor (206) which de-noises reconstructed image data solely in the image domain based on at least one of the Huber roughness penalty iterative minimization algorithms.

19 Claims, 4 Drawing Sheets

(56) References Cited

OTHER PUBLICATIONS

Bruder, H., et al.; 4D Iterative Reconstruction in Cardiac CT for Noise & Dose Reduction at Maintained Temporal Resolution; 2010; The First Int'l Conf. on Image Formation in X-ray Computed Tomography; pp. 268-271.

Douiri, A., et al.; Enhanced detection in CT Colonoscopy using adaptive diffusion filtering; 2009; SPIE Medical Imaging-Image Processing; 7259:1-4.

Erdogan, H., et al.; Monotonic Algorithms for Transmission Tomography; 1999; IEEE Trans. on Medical Imaging; 18(9)801-814.

Hardie, R. C., et al.; Joint MAP Registration and High-Resolution Image Estimation Using a Sequence of Undersampled Images; 1997; IEEE Trans. on Image Processing; 6(12)1626-1629.

Howison, M.; Comparing GPU Implementation of Bilateral and Anisotropic Diffusion Filters for 3D Biomedical Datasets; 2010; Computational Research Division, Ernest Orlando Lawrence Berkeley National Laboratory; pp. 1-9.

Krissian, K.; Flux-based Anisotropic Diffusion Applied to Enhancement of 3-D Angiogram; 2002; IEEE Trans. on Medical Imaging; 21(11)1440-1442.

Thibault, J-B., et al.; A three-dimensional statistical approach to improved image quality for multislice helical CT; 2007; Med. Phys.; 34(11)4526-4544.

Wan, X-F., et al.; Super-resolution Image Reconstruction; 2010; ICCASM; pp. V8-351.

Weickert, J., et al.; Fast Parallel Algorithms for a Broad Class of Nonlinear Variational Diffusion Approaches; 2001; Real-Time Imaging; 7:31-45.

Yu, Z., et al.; Fast Model-Based X-Ray Ct Reconstruction Using Spatially Nonhomogeneous ICD Optimization; 2011; IEEE Trans. on Image Processing; 20(1)161-175.

\* cited by examiner

IMAGE DOMAIN DE-NOISING

CROSS REFERENCE TO RELATED APPLICATIONS

This application is a national filing of PCT application Ser. No. PCT/IB2012/056342,filed Nov. 12, 2012, published as WO 2013/076613 A1 on May 30, 2013, which claims the benefit of U.S. provisional application Ser. No. 61/563,078 filed Nov. 23, 2011, which is incorporated herein by reference.

The following generally relates to de-noising reconstructed image data and finds particular application to a computed tomography (CT) scanner, but is also amenable to other scanners such as a hybrid PET/CT system, a digital X-ray system, and/or other imaging scanner.

A multi-slice computed tomography (CT) scanner includes an x-ray tube mounted on a rotatable gantry that rotates around an examination region about a longitudinal or z-axis. The x-ray tube emits radiation that traverses the examination region and a subject or object therein. A two-dimensional detector array subtends an angular arc opposite the examination region from the x-ray tube. The detector array includes a plurality of rows of detectors that are aligned with respect to each other and that extend along the z-axis. The detectors detect radiation that traverses the examination region and the subject or object therein and generate projection data indicative thereof. A reconstructor processes the projection data and reconstructs volumetric image data indicative thereof.

Generally, the image data will include some level of image noise, for example, due to image acquisition parameters and/or the acquisition system detector and/or other electronics. Such noise may degrade the diagnostic value of the image data and thus the imaging procedure, while exposing the subject to ionizing radiation, which can, among other things, increase the risk of cancer to the subject. Iterative reconstruction (IR) has been proposed to improve image quality over traditional filtered backprojection (FBP) reconstruction and can be used to lower the dose delivered to a subject and/or improve the clarity of the image data for a given dose.

Some IR algorithms have attempted to maximize a cost function that includes a likelihood term which compares a fit to the measured data and a roughness penalty term that is based on the Huber function. Examples of such IR algorithms include H. Erdogan, J. A. Fessler, "Monotonic algorithms for transmission tomography," IEEE Trans. Med. Imag., vol. 18, no. 9, pp. 801-814, 1999, and J. A. Fessler, "Statistical Image Reconstruction Methods", in "Handbook of Medical Imaging Vol. 2: Medical Image Processing and Analysis", SPIE 2000. Unfortunately, such IR algorithms are computationally expensive due to the switching back and forth between the image domain and the projection domain in each iteration of the reconstruction algorithm.

Image domain only de-noising algorithms have also been proposed. Such algorithms have attempted to improve image quality by removing noise from the image data without going back to the projection domain. Such image domain based de-noising algorithms generally are much faster than the above noted IR algorithms, but they do not necessarily provide results that at least match those of the IR algorithms. For instance, a frequently used noise reduction algorithm on two dimensional images is the total variation minimization algorithm described in the chapter 4.5.5. of the textbook by T. Chan, J. Shen, "Image Processing And Analysis" SIAM 2005). This algorithm is effective at removing the noise form the image volume while preserving the edges, but the results are limited by the restriction to the total variation penalty.

Aspects described herein address the above-referenced problems and others.

In one aspect, an image data processing component includes algorithm memory including one or more image domain only iterative de-noising algorithms based on the Huber roughness penalty minimization and a processor which de-noises reconstructed image data solely in the image domain based on at least one of the Huber roughness penalty iterative minimization algorithms.

In another aspect, a method includes de-noising, solely in the image domain with a processor, reconstructed image data with an image domain only iterative de-noising algorithm that is based on the Huber roughness penalty minimization.

In another aspect, computer readable storage medium encoded or embedded with computer readable instructions, which, when executed by a processor of a computing system causes the processor to: de-noise, with a processor and solely in the image domain, reconstructed image data with an iterative de-noising algorithm that is based on the Huber roughness penalty minimization The invention may take form in various components and arrangements of components, and in various steps and arrangements of steps. The drawings are only for purposes of illustrating the preferred embodiments and are not to be construed as limiting the invention.

Figure 1:
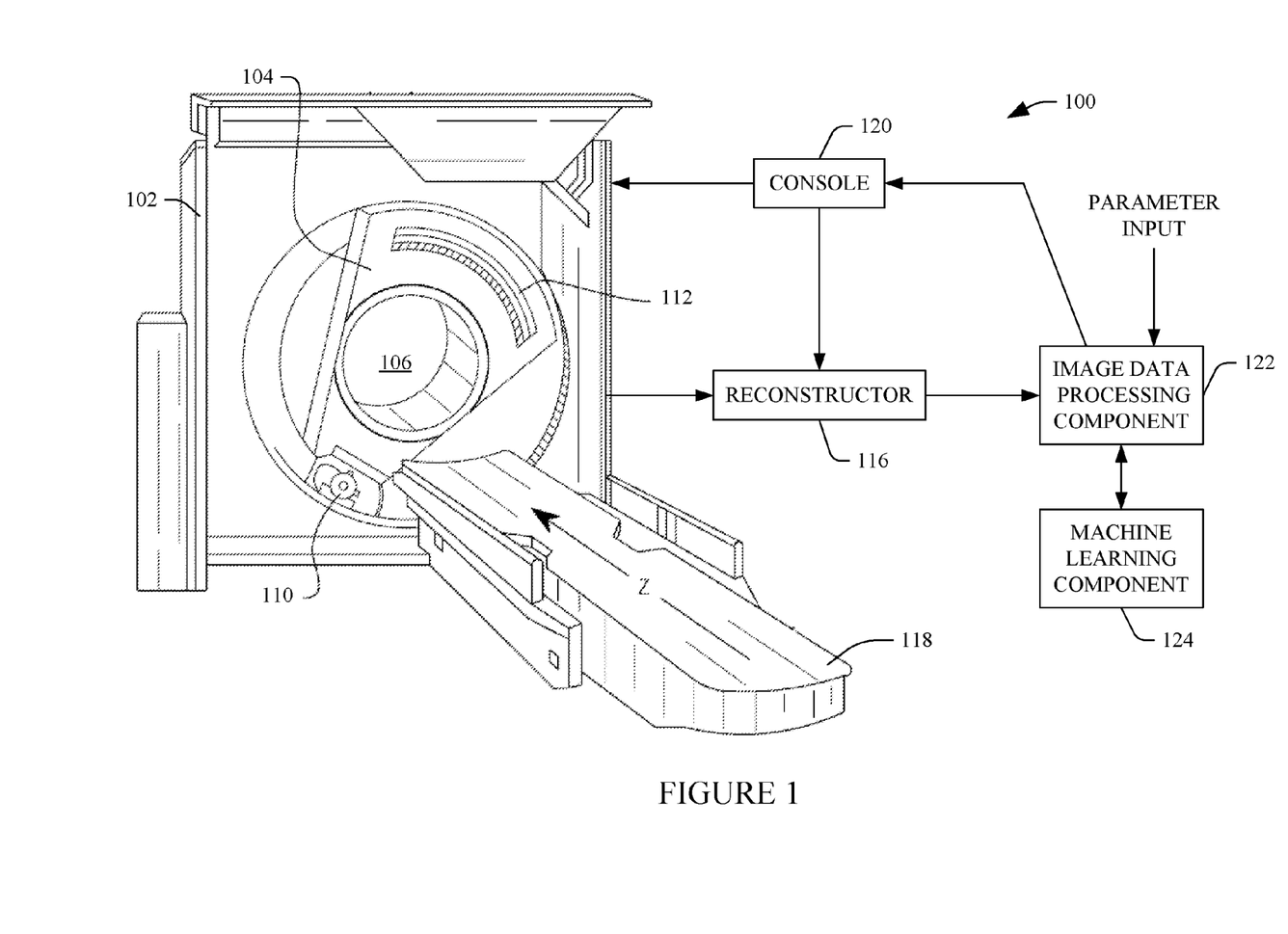
FIG. 1 schematically illustrates an example imaging system in connection with an image data processing component.

FIG. 1 schematically illustrates an imaging system 100 such as a computed tomography (CT) scanner. The imaging system 100 includes a generally stationary gantry 102 and a rotating gantry 104. The rotating gantry 104 is rotatably supported by the stationary gantry 102 and rotates around an examination region 106 about a longitudinal or z-axis.

A radiation source 110, such as an x-ray tube, is rotatably supported by and rotates with the rotating gantry 104 and emits radiation that traverses the examination region 106. A one or two-dimensional radiation sensitive detector array 112 subtends an angular arc opposite the radiation source 110 across the examination region 106 and detects radiation traversing the examination region 106, generating projection data indicative thereof.

A reconstructor 116 reconstructs the projection data and generates three dimensional (3D) volumetric image data indicative thereof. The reconstructor 116 may employ a conventional filtered-backprojection reconstruction algorithm, a cone beam reconstruction algorithm, an iterative reconstruction algorithm and/or other reconstruction algorithm. A patient support 118, such as a couch, supports an object or subject such as a human patient in the examination region 106.

A general-purpose computing system or computer serves as an operator console 120. A processor of the console 120 executes computer readable instructions on the console 120, which allows an operator to control operation of the system 100 such as selecting an imaging protocol including a full dose or low dose imaging protocol, activating image data de-noising, initiating scanning, etc.

An image data processing component 122 processes the reconstructed image data. As described in greater detail below, in one instance, the component 122 employs an algorithm that iteratively de-noises reconstructed image data, in the image domain (i.e., without having to forward projecting the image data to the projection domain), based on the Huber roughness penalty. This may allow for reducing image noise in image data while being less computationally expensive relative to an IR algorithm with the Huber regularization term, which finds the optimal image volume by switching back and forth between the projection and image domains for each iteration. Where the projection data is first de-noised in the projection domain before being reconstructed, the de-noised reconstructed image data may be a close approximation to the image volume produced using an IR algorithm with the Huber regularization. Note that unlike the noise reduction algorithm of T. Chan, J. Shen discussed in the background, which is a total variation (TV) minimization on two dimensional (2D) images, the image data processing component 122 employs a three-dimensional (3D) algorithm that incorporates the Huber penalty from the IR algorithms (and not the total variation penalty).

An optional machine learning component 124 can be employed to record values of one or more parameters used by the image data processing component 122 that were input and/or adjusted by a radiologist, a technologist, and/or other authorized personnel, and use this information to recommend parameter values for the radiologist, technologist, and/or other authorized personnel and/or automatically load the recommended parameter values in the imaging data processing component 122 for subsequent de-noising of image data. The radiologist, technologist, and/or other authorized personnel can accept and/or modify one or more recommend and/or automatically loaded parameter values. Past and/or current values and/or changes to the values of the parameters can be visually displayed or presented, for example, via a graphical user interface (GUI) or otherwise, with a display monitor of the console 120, the image data processing component 122, the optional machine learning component 124 and/or other device. Generally, the component 124 can employ algorithms which allow the component 124 to learn via inductive inference, pattern recognition, classification, statistics, etc. from the input data and predict future data based thereon.

Figure 2:
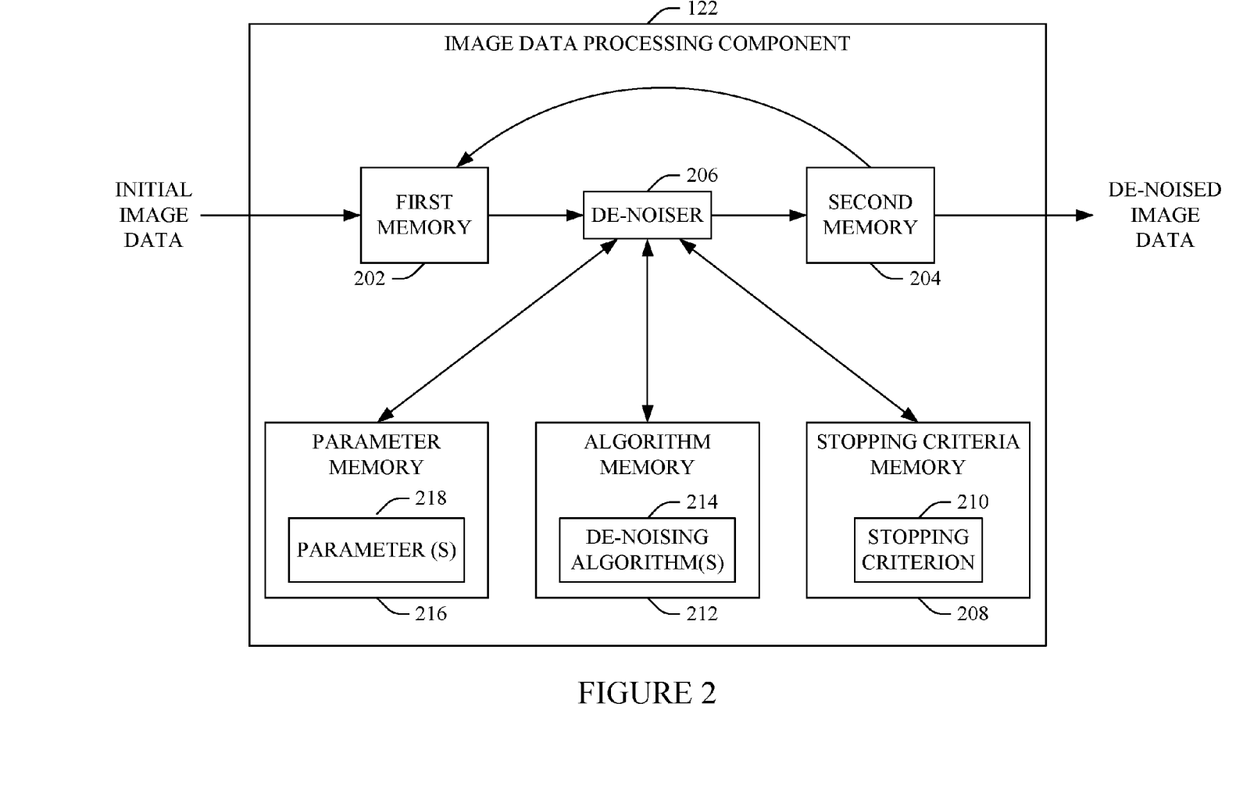
FIG. 2 schematically illustrates an example of the image data processing component.

FIG. 2 schematically illustrates an example of the image data processing component 122.

First memory 202 is used to store reconstructed image data to be de-noised. In one instance, such image data is image data that has not yet been de-noised by the component 122. In another instance, such image data is image data that has been de-noised by the component 122 over one or more iterations and is to be de-noised again. In either instance, the image data may have previously been de-noised in the projection domain and/or the image domain de-noising approach. Second memory 204 is used to store image data that has been de-noised by the component 122 over at least one de-noising iteration. It is to be appreciated that the first and second memory 202 and 204 may be part of the same physical memory or different physical memory.

A microprocessor or de-noiser 206 iteratively de-noises image data. This includes de-noising the image data stored in the first memory 202 and storing this de-noised image data in the second memory 204 for an iteration. For a subsequent iteration, the de-noiser 206 replaces the image data in the first memory 202 with the de-noised image data in the second memory 204 and de-noises the newly stored image data (i.e., previously de-noised image data) in the first memory 202, storing the new de-noised image data in the second memory 204. Where no further de-noising iterations are to be performed, the de-noised image data is stored in and/or conveyed and/or retrieved from the second memory 204.

Stopping criteria memory 208 includes one or more stopping criterion 210 for terminating de-noising by the de-noiser 206. Examples of suitable stopping criterion include, but are not limited to, a pre-determined number of iterations, a pre-determined error tolerance between data from consecutive iterations, a pre-determined time duration, etc. Such criterion can be default and/or user defined, and may depend on the imaging protocol, the user, the reading radiologist, the imaging facility, and/or other information.

An algorithm memory 212 includes one or more de-noising algorithms 214 that used by the de-noiser 206 to de-noise image data. A non-limiting example of a suitable algorithm can be derived from the partial differential equation shown in EQUATION 1:

$$0 = -div\left(\delta \frac{\nabla u}{\max(|\nabla u|, \delta)}\right) + \beta w \cdot (u_o - u),\qquad \text{EQUATION 1}$$

where u represents de-noised image volume (i.e. the solution of the EQUATION 1), $u_0$ represents the initial noisy image data being de-noised, w represents a statistical weighting, and δ and β represent tuning parameters, the symbol ∇ denotes the gradient operator and div is the divergence operator. Generally, the term $$div\left(\delta \frac{\nabla u}{\max(|\nabla u|, \delta)}\right)$$

is a noise penalty term which corresponds to the Huber roughness penalty, and the term $\beta w \cdot (u_0 - u)$ represents constraints on the image data.

A non-limiting example of a suitable statistical weighting w is shown in EQUATION 2:

$$w = \sqrt{bp}(y_0),\qquad \text{EQUATION 2}$$

where $y_0$ represents the corresponding projection data expressed as a number of detected x-ray photons and $bp(y_0)$ represents the backprojected number of detected x-ray photons. In EQUATION 2, w is the reverse proportional to the noise in the image, which can be obtained by propagating a projection data noise model into the image domain using a modified filtered backprojection or by a noise measurement from the image data. Generally, w determines the aggressiveness of the de-noising.

The tuning parameters δ and β are free variables (which are strictly positive real scalars) that can be set to default and/or user defined values, values determined by the machine learning component 124, and/or other values, and, in some instances, can be changed by a user and/or computer. The parameter δ generally determines the strength of the de-noising, and β generally determines the smoothness of the de-noising (i.e., whether the final de-noised image data is smoother or closer to the initial noisy image data $u_0$). Parameter memory 216 stores one or more parameters 218 such as one or more of the variables δ and β and/or other parameter(s).

Figure 3:
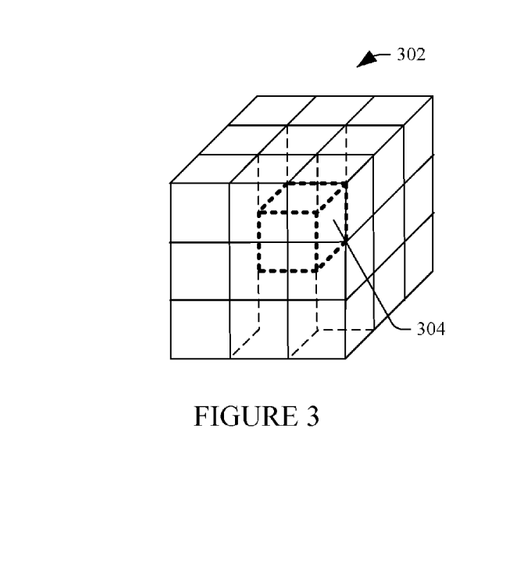
FIGS. 3 and 4 schematically illustrates a block of voxel, including a voxel to be de-noised and neighboring voxels used to de-noise the voxel.

A non-limiting example of de-noising a voxel of CT image data based on EQUATION 1 is described next in connection with FIGS. 3 and 4.

It is to be appreciated that the de-noising can be extended, serially and/or concurrently, to one or more other voxels of the image data. The image volume is sampled by a voxel grid, each voxel having the size of $d_x \times d_y \times d_z$ in unit length. FIG. 3 shows a three by three by three (3×3×3) (or three dimensional (3D)) sub-block of voxels 302 of the image data, including a voxel 304 to be de-noised, which, in FIG. 3, is the voxel located at the center of the sub-block of voxels 302. The illustrated example uses a sub-portion of voxels of the sub-block of voxels 302 in the de-noising of the voxel 304. In other embodiments, voxels in addition to and/or in alternative to the voxels of the sub-block of voxels 302, including a two dimensional (2D) sub-block of voxels, can be used to update the voxel 304 each de-noising iteration.

Figure 4:
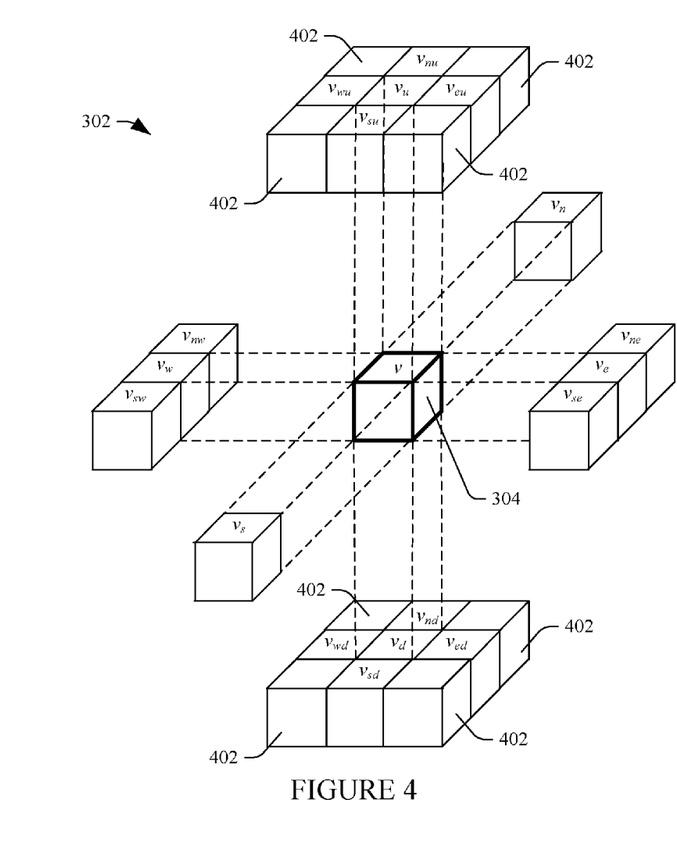

FIG. 4 shows an exploded view of the sub-block of voxels 302. In FIG. 4, the voxel 304 is designated as v and has coordinates $u_{i,j,k}$, and the neighboring voxels used in this example for de-noising are identified as: $v_{nd}=u_{i-1,j,k-1}$, $v_{wd}=u_{i,j-1,k-1}$, $v_d=u_{i,j,k-1}$, $v_{ed}=u_{i,j+1,k-1}$, $v_{sd}=u_{i+1,j,k-1}$, $v_{nw}=u_{i-1,j-1,k}$, $v_n=u_{i-1,j,k}$, $v_{ne}=u_{i-1,j+1,k}$, $v_w=u_{i,j-1,k}$, $v=u_{i,j,k}$, $v_e=u_{i,j+1,k}$, $v_{sw}=u_{i+1,j-1,k}$, $v_s=u_{i+1,j,k}$, $v_{se}=u_{i+1,j+1,k}$, $v_{nu}=u_{i-1,j,k+1}$, $v_{wu}=u_{i,j-1,k+1}$, $v_u=u_{i,j,k+1}$, $v_{eu}=u_{i,j+1,k+1}$, and $v_{su}=u_{i+1,j,k+1}$, where n, s, e, w, u and d represent relative positions corresponding to north, south, east, west, up and down, with respect to the voxel v. Since the update scheme may include voxels with indices that are out of range, voxels at those locations are extrapolated or padded. Corner voxels 402 are not used in this example for de-noising, but could be in other embodiments.

For this example, EQUATION 1 is discretized based on EQUATION 3:

$$0 = -[\Sigma_{P \in I} W_P \cdot (v_P - u_{i,j,k}^{n+1})]\delta + (u_{i,j,k}^{n+1} - u_{i,j,k}^0)\beta w_{i,j,k}, \quad \text{EQUATION 3}$$

and solved for the update term $u_{i,j,k}^{n+1}$ for the voxel v as shown in EQUATION 4:

$$u_{i,j,k}^{n+1} = \frac{\beta w_{i,j,k} u_{i,j,k}^n + \delta \sum_{P \in I} \frac{W_P v_P}{d_P}}{W_{sum}}, \quad \text{EQUATION 4}$$

where n+1 represents the de-noising iteration (n=0 to $N_{iter}$, which is the maximum number of iterations), $u_{i,j,k}^n$ represents the voxel being de-noised, δ and β are as defined above and respectively represent a de-noising strength parameter and a de-noising smoothing parameter, I=n, s, e, w, u and d, P represents an index, $v_P$ represents neighboring voxels, $W_P$ represents weights for the neighboring voxels, $W_{sum}$ represents a sum of the weights $W_P$, and $d_P$ represents the size of the voxel in a given direction: $d_n$ and $d_s=d_x$, $d_w$ and $d_e=d_y$, and $d_u$ and $d_d=d_z$.

The value of $W_{sum}$ can be determined as shown in EQUATION 5:

$$W_{sum} = \beta w_{i,j,k} + \delta \sum_{P \in I} \frac{W_P}{d_P}, \quad \text{EQUATION 5}$$

and $W_P$ can be determined as shown in EQUATION 6:

$$W_P = \frac{1}{\max(D_P, \delta)}. \quad \text{EQUATION 6}$$

$D_P$ can be determined as shown in EQUATIONS 7-12:

$$D_n = \sqrt{\frac{(v_n - v)^2}{d_x^2} + \left[\frac{v_w + v_{nw} - v_e - v_{ne}}{4d_y}\right]^2 + \left[\frac{v_u + v_{nu} - v_d - v_{nd}}{4d_z}\right]^2}, \quad \text{EQUATION 7}$$

$$D_s = \sqrt{\frac{(v_s - v)^2}{d_x^2} + \left[\frac{v_w + v_{sw} - v_e - v_{se}}{4d_y}\right]^2 + \left[\frac{v_u + v_{su} - v_d - v_{sd}}{4d_z}\right]^2}, \quad \text{EQUATION 8}$$

$$D_e = \sqrt{\frac{(v_e - v)^2}{d_y^2} + \left[\frac{v_n + v_{ne} - v_s - v_{se}}{4dx}\right]^2 + \left[\frac{v_u + v_{eu} - v_d - v_{ed}}{4d_z}\right]^2}, \quad \text{EQUATION 9}$$

$$D_w = \sqrt{\frac{(v_w - v)^2}{d_y^2} + \left[\frac{v_n + v_{nw} - v_s - v_{sw}}{4d_z}\right]^2 + \left[\frac{v_u + v_{wn} - v_d - v_{wd}}{4d_z}\right]^2}, \quad \text{EQUATION 10}$$

$$D_u = \sqrt{\frac{(v_u - v)^2}{d_z^2} + \left[\frac{v_w + v_{wu} - v_e - v_{eu}}{4d_y}\right]^2 + \left[\frac{v_n + v_{nu} - v_s - v_{su}}{4d_x}\right]^2}, \quad \text{EQUATION 12}$$

and $$D_d = \sqrt{\frac{(v_d - v)^2}{d_z^2} + \left[\frac{v_w + v_{wd} - v_e - v_{ed}}{4d_y}\right]^2 + \left[\frac{v_n + v_{nd} - v_s - v_{sd}}{4d_x}\right]^2}. \quad \text{EQUATION 13}$$

Other approaches to calculating $W_{sum}$, $W_P$, and/or $D_P$ are also contemplated herein.

The de-noiser 206 employs EQUATION 4 each iteration to de-noise the voxel 304. In this example, the de-noiser 206 de-noises using EQUATION 4 until $N_{iter}$ is reached. As noted herein, de-noising may also be terminated based on a predetermined error between consecutive image data sets, lapse of a predetermined time limit, via manual interruption by a use, and/or otherwise.

Figure 5:
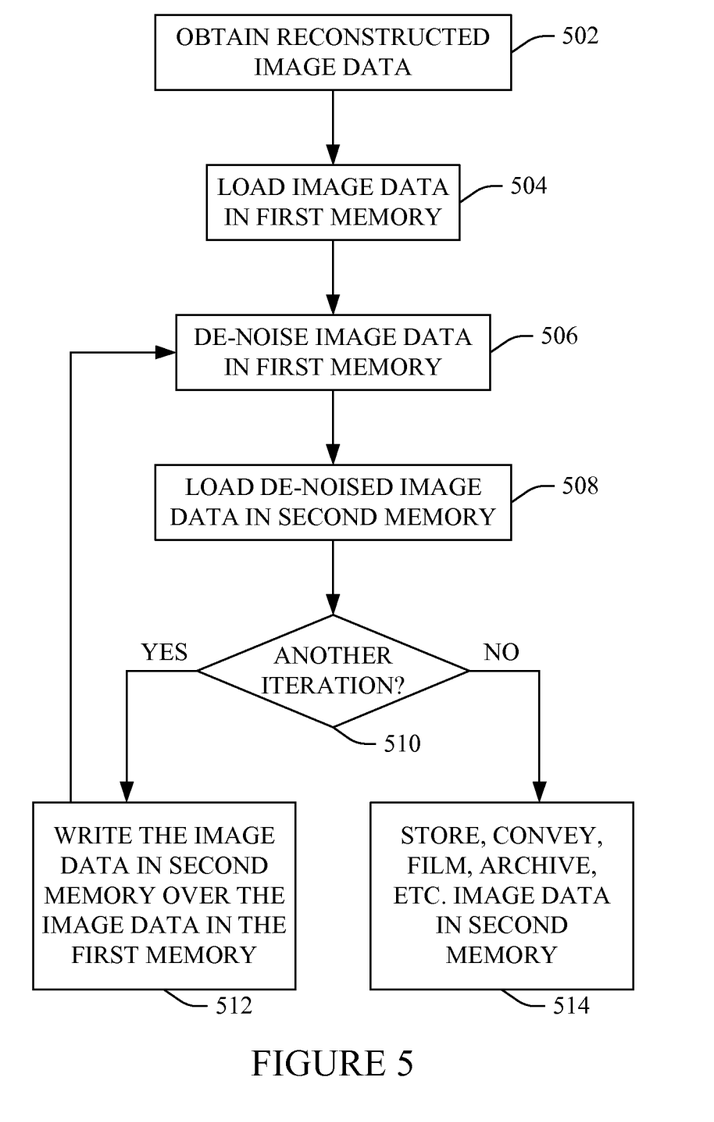
FIG. 5 illustrates a method for de-noising reconstructed image data based on the Huber roughness penalty.

FIG. 5 illustrates an example method for de-noising reconstructed image data based on the Huber roughness penalty minimization.

It is to be appreciated that the ordering of the acts in the methods described herein is not limiting. As such, other orderings are contemplated herein. In addition, one or more acts may be omitted and/or one or more additional acts may be included.

At 502, reconstructed image data is obtained.

At 504, the reconstructed image data is loaded into the first memory 202.

At 506, the reconstructed image data in the first memory 202 is de-noised based on EQUATION 4 as described herein. This can be done on a per voxel basis, in series or parallel.

At 508, the de-noised image data is stored in the second memory 204.

At 510, it is determined if another de-noising iteration is to be performed. As described herein, the stopping criteria can be based on one or more of a predetermined number of iterations, lapse of a predetermined time period, etc.

If so, then at 512 the de-noised image data in the second memory 204 is written over the image data in the first memory 202, and acts 506 to 510 are repeated.

If not, then at 514 the de-noised image data is displayed, conveyed to another device, filmed, archived, etc.

The above can be implemented via a processor executing one or more computer readable instructions encoded or embedded on computer readable storage medium such as physical memory. Such a processor can be part of the image data processing component 122, the console 120, and/or other computing device. Additionally or alternatively, the processor can execute at least one computer readable instructions carried by a carrier wave, a signal, or other non-computer readable storage medium such as a transitory medium.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. An image data processing component, comprising:
    algorithm memory including one or more image domain only iterative de-noising algorithms based on the Huber roughness penalty minimization; and
    a processor which de-noises reconstructed image data solely in the image domain based on at least one of the Huber roughness penalty iterative minimization algorithms which includes a first parameter that is a free variable and in a first term determines a strength of the de-noising and a second parameter that is a free variable and in a second term determined a smoothness of the de-noising,
    wherein the first term, which is based on the Huber roughness penalty minimization, includes a product of the first parameter and a weighted sum of neighboring voxels to a voxel adjusted for size that determines a strength of the de-noising.

2. The image data processing component of claim 1, wherein values of the first parameter and the second parameter are strictly positive scalars determined from a user input.

3. The image data processing component of claim 1, wherein the at least one algorithm de-noises individual voxels concurrently.

4. The image data processing component of claim 1 wherein the at least one algorithm includes a function which de-noises a voxel in the reconstructed image data by:

$$u_{i,j,k}^{n+1} = \frac{\beta w_{i,j,k} u_{i,j,k}^n + \delta \sum_{P \in I} \frac{W_P v_P}{d_P}}{W_{sum}},$$

where n+1 represents a de-noising iteration, $u_{i,j,k}^n$ represents the voxel being de-noised, $\delta$ is the first parameter, $\beta$ is the second parameter, I=n, s,e,w,u and d that represent three dimensional relative positions with respect to the voxel being de-noised, P represents an index, $v_P$ represents neighboring voxels, $W_P$, and represents weights for the neighboring voxels, $W_{sum}$ represents a sum of the weights $W^P$, and $d_P$ represents the size of the voxel in a given direction: $d_n$ and $d_s=d_x$, $d_w$ and $d_e=d_y$, and $d_u$ and $d_d=d_z$.

5. The image data processing component of claim 1, further including:
    a machine learning component, which determines at least one recommended value of the first and second parameters based on at least one previous user adjustment to the at least one value.

6. The image data processing component of claim 1, wherein the at least one algorithm includes a summation of the first and second terms, and the second term is a product of the second parameter and a previous value of the voxel.

7. The image data processing component of claim 1, wherein the processor iteratively de-noises the reconstructed image data until one of a predetermined number of iterations is reached, a predetermined period of time has lapsed, or a predetermined error tolerance for a difference value between data produced by consecutive iterations is satisfied.

8. The image data processing component of claim 1, wherein the at least one algorithm does not forward project the reconstructed image data to the projection domain for any of the de-noising iterations.

9. The image data processing component of claim 1, wherein the reconstructed image data is generated with projection data de-noised solely in the projection domain.

10. A method, comprising:
    de-noising, solely in the image domain with a processor, reconstructed image data with an image domain only iterative de-noising algorithm that is based on the Huber roughness penalty minimization which includes a first parameter that is a free variable and in a first term determines a strength of the de-noising, and a second parameter that is a free variable and in a second term determines a smoothness of the de-noising,
    wherein the first term, which is based on the Huber roughness penalty minimization, includes a product of the first parameter and a weighted sum of neighboring voxels to a voxel adjusted for size that determines a strength of the de-noising.

11. The method of claim 10, wherein the at least one algorithm includes a function which de-noises a voxel in the reconstructed image data by:

$$u_{i,j,k}^{n+1} = \frac{\beta w_{i,j,k} u_{i,j,k}^n + \delta \sum_{P \in I} \frac{W_P v_P}{d_P}}{W_{sum}},$$

where n+1 represents a de-noising iteration, $u_{i,j,k}^n$ represents the voxel being de-noised, $\delta$ is the first parameter, $\beta$ is the second parameter, I=n, s,e,w,u and d that represent three dimensional relative positions with respect to the voxel being de-noised, P represents an index, $v_P$ represents neighboring voxels, $W_P$, and represents weights for the neighboring voxels, $W_{sum}$ represents a sum of the weights $W^P$, and $d_P$ represents the size of the voxel in a given direction: $d_n$ and $d_s=d_x$, $d_w$ and $d_e=d_y$, and $d_u$ and $d_d=d_z$.

12. The method of claim 10, further comprising:
    de-noising the reconstructed image data on an individual voxel basis.

13. The method of claim 12, further comprising:
    de-noising two or more of the individual voxels in parallel.

14. The method of claim 12, further comprising:
    de-noising the individual voxel based on a predetermined set of neighboring voxels.

15. The method of claim 10, wherein the algorithm sums the first term and the second term, and the second term is a product of the second parameter and a previous value of the voxel.

16. The method of claim 15, wherein at least one of the first or the second parameters is based on a recommendation from a machine learning component.

17. The method of claim 16, further comprising:
visually presenting via a display monitor at least one of the first or second parameters.

18. The method of claim 17, further comprising:
receiving an input indicative of a value for at least one of the first or second parameters; and
using the value as the value of the at least one of the first or second user adjustable parameters.

19. A computer readable storage medium encoded or embedded with computer readable instructions, which, when executed by a processor of a computing system causes the processor to:
de-noise voxels sampled individually from reconstructed image data, with a processor and solely in a domain of the reconstructed image data with an iterative denoising algorithm that is based on the Huber roughness penalty minimization which includes a first parameter that is a free variable and in a first term determines a strength of the de-noising, and a second parameter that is a free variable and in a second term determines a smoothness of the de-noising,
wherein the first term, which is based on the Huber roughness penalty minimization, includes a product of the first parameter and a weighted sum of neighboring voxels to a voxel adjusted for size that determines a strength of the de-noising.

* * * * *